United States Patent [19]
Baron et al.

[11] Patent Number: 4,618,228
[45] Date of Patent: Oct. 21, 1986

[54] BIFOCAL CONTACT LENS OF THE BIVISUAL TYPE

[75] Inventors: Heinz Baron, Frechen-Buschbell; Peter Hoefer, Aschaffenburg; Herbert Schwind, Glattbach, all of Fed. Rep. of Germany

[73] Assignee: Titmus Eurocon Kontaktlinsen GmbH, Aschaffenburg, Fed. Rep. of Germany

[21] Appl. No.: 559,735

[22] Filed: Dec. 9, 1983

[51] Int. Cl.$^4$ .......................... G02C 7/04; G02C 7/06
[52] U.S. Cl. .................................................. 351/161
[58] Field of Search ............... 351/160 R, 160 H, 161, 351/162

[56] References Cited
FOREIGN PATENT DOCUMENTS

| | | | |
|---|---|---|---|
| 262963 | 11/1965 | Australia | 351/161 |
| 2340560 | 2/1977 | France | 351/161 |
| 2041557 | 9/1980 | United Kingdom | 351/161 |

OTHER PUBLICATIONS

Obrig, T. E., *Modern Ophthalmic Lenses and Optical Glass,* New York (1944), pp. 266–269.

Primary Examiner—John K. Corbin
Assistant Examiner—Scott J. Sugarman
Attorney, Agent, or Firm—Felfe & Lynch

[57] ABSTRACT

A bifocal contact lens has two, differently-focusing lens parts with a transitional zone therebetween and an arrangement to orient the zone vertically in use. The focus of the lens part then closer to user's nose is preferably adapted for reading and the other for distance. Preferably, too, the transitional area runs across the optical and physical center of at least an optical portion of the lens.

4 Claims, 1 Drawing Figure

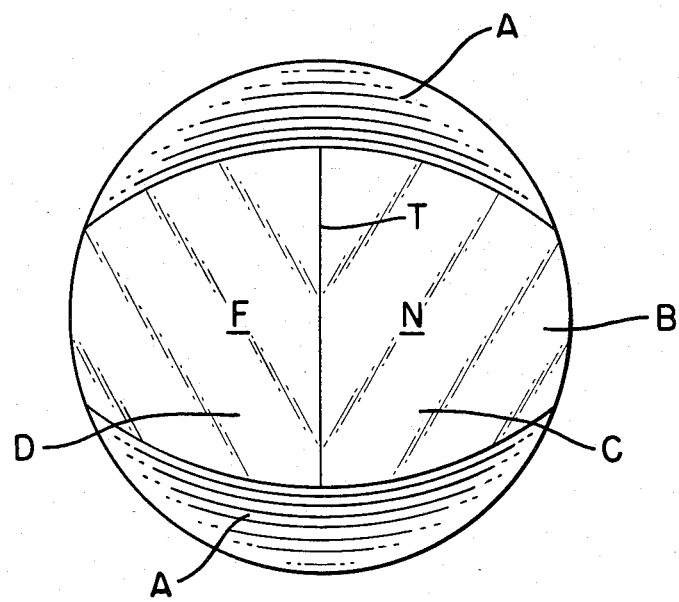

BIFOCAL CONTACT LENS OF THE BIVISUAL TYPE

BACKGROUND OF THE INVENTION

The invention relates to a bifocal contact lens of the bivisual type and, more particularly, without any image jump.

Bifocal contact lenses of alternating and bivisual types are available for presbyopic persons. The lenses of the alternating type include variously-configured, segmentally-ground (bifocal) lenses having an essentially-horizontal zone of separation or transitional line (or, more precisely, an area as used hereinafter) between two upper and lower areas of different vertex powers for the distance zone and the reading zone. Using this type of contact lenses, it is difficult to determine the correct segment height when fitting the lens. Furthermore, there is a considerable image jump at the transitional area in some lenses of this type.

In the known bifocal contact lenses of the bivisual type, which sometimes are also known as the simultaneous type, the distance-focusing part is in the center of the lens, and the reading-focusing part is located peripherally around the distance-focusing part. For bifocal operation, the distance part and the reading part must simultaneously cover portions of the pupil area, preferably one-half of the pupil area each, so that simultaneous imaging from the distance and reading parts takes place. This type of contact lens makes it possible to prescribe thin minilenses with relatively steep base curves, so that corneal temperature is kept low and corneal gas exchange is impaired as little as possible. Also, in cases of large pupil diameters of the lens wearers, the lens can be made large so that head attitudes are unnecessary either for reading or viewing at distances. However, double images, particularly of bright objects, and thereby reduction of image contrast are disturbing. Rotational movement of these concentric bivisual lenses is clearly not disadvantageous, so that additional means of stabilizing the position of the lenses on corneas are not necessary, but problems do occur with vertical movement of the lenses on account of differences in the intrinsic brightness (tunnel effect) of the images from the concentric, differently-focusing parts.

A review of various bifocal lens systems and the limits of their application is contained in a paper presented at the 14th Convention of the VDC in Nuernberg in 1969 by Guenter Giefer, entitled, "*Die verschiedenen Bifokallinsensysteme - Moeglichkeiten und Grenzen ihrer Anpassung*" ["bifocal lens systems - possibilities and limits of their application"] (printed in *NOJ*, June 1969) and in the textbook *Kontaklinsen* [*Contact Lenses*] by Heinz Baron, 1981, *Verlag Optische Fachveroeffentlichung GmbH*, Heidelberg.

THE INVENTION

It is an objective or aim of the invention to create a bifocal contact lens of the bivisual type in which vertical movement of the lens will not affect the bivisual acuity.

The objective or aim is achieved in accordance with the invention in that, with the lens on the eye, the transitional or separation zone, line, or area between two differently-focusing parts of the lens runs from the upper to the lower part of the lens, depending on the type. This divides the lens into a nasal (closer to the wearer's nose) part and a temporal (away from the wearer's nose) part for reading-focusing and distance-focusing parts. To maintain the orientation of the transition area, the lens is provided with a stabilization arrangement which is known, in itself.

Advantageously, the transitional zone or area runs through the center of the optical part of the lens and is in the vertical meridial section of the total, physical lens body.

The advantages achieved hereby are to be seen in the fact that differences in brightness of objects have no effect on their perception through the lens. The principle of the invention operates independently of pupil size variations (unlike concentric bifocal arrangements where the pupil could get too small for effective vision through the peripheral part of the lens). Furthermore, tunnel effects are prevented. The eclipsing of a zone, such as can occur when using concentric contact lenses of the bivisual type, or contact lenses based on the alternating principle (segment types), is also avoided.

In a preferred embodiment of the invention, the optical part of the contact lens is divided into two areas by a transition zone running substantially vertically, the distance part and the reading part each covering half of the pupil area simultaneously. Even vertical movement of the lens therefore will have no effect on the bivisual view, due to the vertical orientation of the transition area or zone of separation between the distance part and the reading part of the lens. Even pupil dilation occurring at low light levels or at night, does not result in blurring of the visualized image, because equivalent portions of the pupil area are always covered by the distance part and the reading part.

For stabilizing the orientation of the lens on the eye, known stabilization arrangements are suitable. For example, crescent-shaped stabilization edges (slab-off) which are thinner at the lower and upper part of the lens can be used for lens stabilization through blinking in accordance with U.S. Pat. No. 4,095,878, issued June 20, 1978 in the name of Peter Fanti with priority from German patent No. 24 15 108. It is also possible to generate the lower part of the contact lens heavier so that the center of gravity below the horizontal axis of the lens stabilizes the orientation by gravity (prism ballast), as is known, for example, in a bifocal contact lens with the reading part and the distance, part disposed concentrically from German patent No. 1,136,846. Instead of the prism ballast, an embedded metal ballast can be used for gravitational positional stabilization. It is also possible to use for stabilization of the lens position a known, so-called truncation allowing the contact lens to rest and stabilize on the lower eyelid. The prism ballast and the truncation can also be combined and the supporting edge can also be used. Also suitable for stabilization is an oval-shaped lens design. Also, the back surface or the front surface of the lens can be made peripherally toric for position stabilization.

A variety of manufacturing methods are suitable for achieving the vertically-divided areas of different refractive powers for the reading and distance parts of the lens. As is known, for example from the above-mentioned paper presented by Guenter Giefer, two materials of different indices of refraction can be used, possibly with a front or rear melding of these two materials to avoid an abrupt image jump therefrom. Alternatively, different front surface or back surface curvatures can be used on opposite sides of the transition area to assure the different, vertically-separated refractive powers. Also suitable is the combined use of two materials of different refractive indices and different surface curvatures on either the len's front or on the lens's back surface.

DESCRIPTION OF A PREFERRED EMBODIMENT

The appended drawing, which represents an embodiment of the invention, will serve for its further explanation without specific limitation thereto.

The bifocal contact lens of the bivisual type represented schematically in the appended drawing has a reading part marked N in the lens area C and a distance part marked F in the lens area D, the lens areas C and D together are the optic zone of the lens body. An area of transition or zone of separation, represented by separation line T, between the two maximum refraction values of the reading part and distance part is vertically oriented in the central plane of the contact lens body. This line of separation T extends from the lower to the upper edge to divide the optical part of the contact lens body into the lens area C for the reading part N and the lens area D for the distance part. When the contact lens is in situ, the reading part N is oriented nearer to the nose of the wearer so that area C is also called the nasal area, and the distance area D, the temporal area situated away from the wearer's nose. B indicates a lenticular zone of the lens which can be provided on the front side of the lens body.

Crescent-shaped stabilization flanks A are provided in the upper and lower parts of the lens. By means of these stabilization flanks A, known through German patent No. 24 15 108, dynamic stabilization (orientation) of the contact lens on the cornea is achieved during blinking.

By means of the stabilized position, in the event of a vertical movement of the lens, the bivisual view will not be affected, since the line of separation or transitional zone between reading part N and distance part F keeps T vertically oriented.

By this, the reading part and the distance part equally cover the pupil area, preferably half each, when the lens is centered on the eye.

It will be understood that the specification and examples are illustrative but not limitative of the present invention and that other embodiments within the spirit and scope of the invention will suggest themselves to those skilled in the art.

What is claimed is:

1. A bifocal contact lens of the bivisual (simultaneous-vision) type, comprising:
    a reading-focusing lens part (N) and a distance-focusing lens part (F) of different refractive powers and a transitional area (T) therebetween, and
    means for stabilizing of the lens on the eye in such a way that the transitional area (T) runs from the lower to the upper part of the lens with the reading-focusing lens part (N) located nasally and the distance-focusing lens part (F) located temporally when the lens is in situ.

2. The lens according to claim 1, wherein the transitional area (T) divides the pupil of the eye into substantially equal parts when the lens is in situ.

3. The lens according to claim 2, wherein the transitional area (T) runs through the geometric center of the lens.

4. The lens according to claim 2, wherein the transitional area (T) coincides with the vertical meridian of the lens.

* * * * *